J. THOMPSON.
VALVE SEAT.
APPLICATION FILED JULY 17, 1912.
1,067,284.
Patented July 15, 1913.
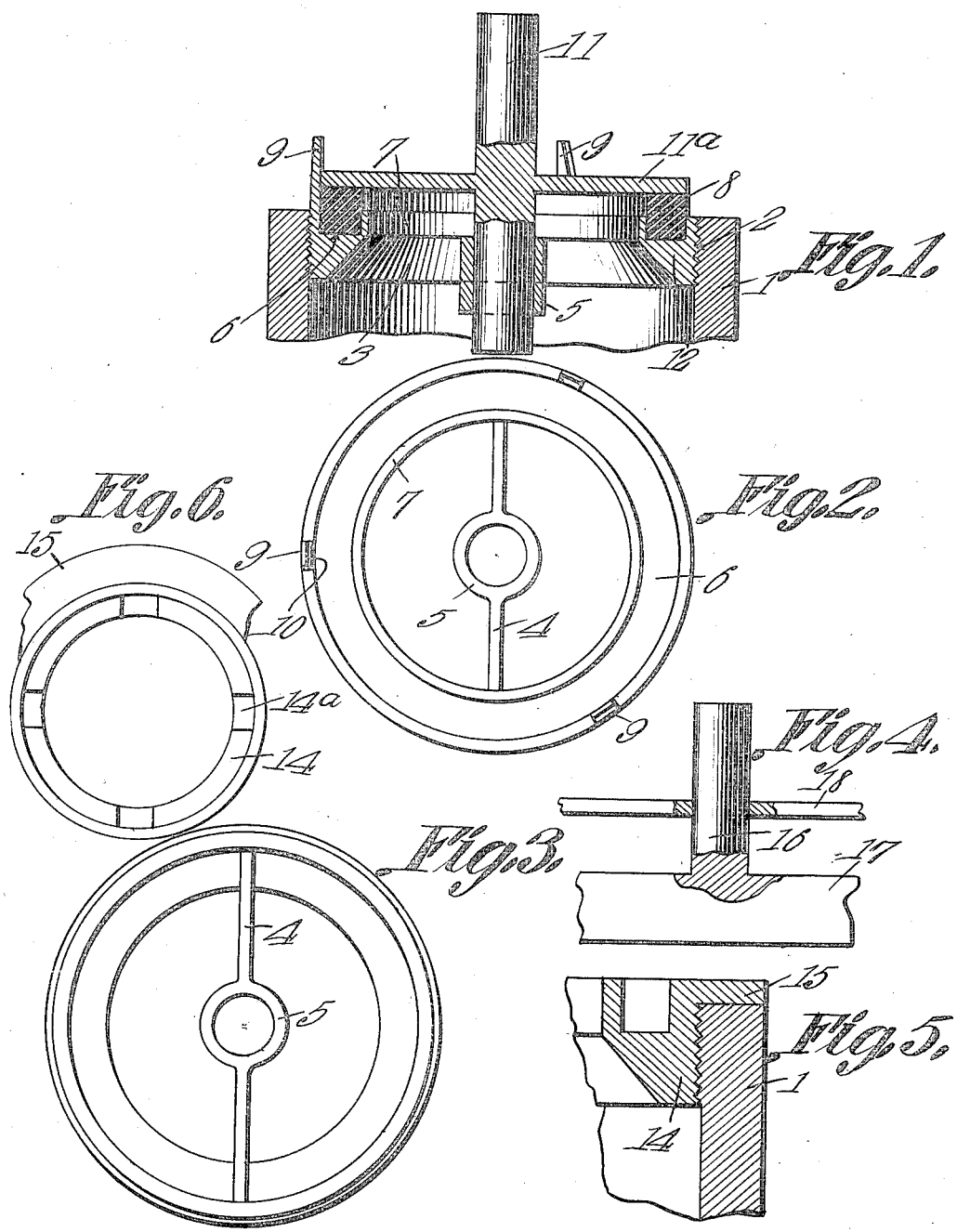
John Thompson, Inventor
by C. A. Snow & Co., Attorneys

UNITED STATES PATENT OFFICE.

JOHN THOMPSON, OF TAFT, CALIFORNIA, ASSIGNOR OF FORTY-NINE ONE-HUNDREDTHS TO GEORGE A. BARR, OF TAFT, CALIFORNIA.

VALVE-SEAT.

1,067,284.

Specification of Letters Patent.

Patented July 15, 1913.

Application filed July 17, 1912. Serial No. 710,013.

*To all whom it may concern:*

Be it known that I, JOHN THOMPSON, a citizen of the United States, residing at Taft, in the county of Kern and State of California, have invented a new and useful Valve-Seat, of which the following is a specification.

The device forming the subject-matter of this application is a valve seat adapted to be employed in pumps which handle mud, slush, oil, and in structures where a fluid-tight joint is required at the valve.

One object of the present invention is to provide a valve seat adapted to retain a packing in a novel manner.

Another object of the invention is to provide novel means for directing the movement of the valve, for facilitating a removal of the valve seat, and for holding the packing in place against lateral expansion.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows one form of the invention in transverse section; Fig. 2 is a top plan of the valve seat shown in Fig. 1; Fig. 3 is a bottom plan of the valve seat shown in Fig. 2; Fig. 4 is a transverse sectional detail showing a modified form of the invention; Fig. 5 is a transverse sectional detail showing a still further modification of the invention, and Fig. 6 is a bottom plan showing a further modification.

In the accompanying drawings, the numeral 1 serves to indicate generally, a portion of a pump, and the numeral 12 serves to indicate generally, the valve seat. The valve seat 12 may be mounted in the pump 1 in any desired manner, but in the present instance, the seat 12 is threaded into the pump 1, as indicated at 2. The lower portion of the bore of the valve seat 12 flares as indicated at 3, and across the flaring portion 3 of the bore of the valve seat extends arms 4, of which there may be any number, the arms 4 supporting a bearing 5. In the upper face of the valve seat 12 there is a groove 6, defining inner and outer walls, denoted by the numeral 7, there being a resilient packing 8 located in the groove 6 and restrained laterally by the walls 7. The packing 8 preferably is continuous, although this detail is not insisted upon. The packing 8 upstands above the upper face of the valve seat 12. Formed integrally with the valve seat 12, and alined with the outer wall 7 are spaced fingers 9, the inner faces of which slant downwardly and inwardly, as indicated at 10. There may be any number of the fingers 9, and they exercise three functions. First, they serve as a means for directing the valve, hereinafter described, into engagement with the packing 8; secondly, they constitute means for limiting the lateral expansion of the packing; and third, they constitute members adapted to be engaged by a wrench to rotate the valve casing.

The valve structure may be of any form. In the present instance, a stem 11 is mounted to reciprocate in the bearing 5, the stem carrying a valve 11$^a$, adapted to rest upon the packing 8, and to be directed upon the packing by the slant faces 10 of the fingers 9.

If desired, referring to Fig. 5, the valve seat 14 may be equipped with a lateral flange 15, adapted to overlie the upper edge of the pump cylinder 1.

Referring to Fig. 4, it will be understood that the stem 16 may be formed integrally with the arms 17, the valve 18 being mounted to slide upon the stem.

If desired, as shown in Fig. 6, the valve seat may be provided in its lower face with recesses 14$^a$ which are adapted to receive the lugs of a collapsible wrench. The recesses 14 do not extend through the seat into the threading, neither do they communicate with the packing-groove.

Having thus described the invention, what is claimed is:—

1. A valve seat comprising an annular member having an annular groove in its upper face, the groove defining inner and outer walls; a resilient packing mounted in the groove and engaged laterally by the walls, the packing upstanding above the walls; there being free ended fingers alined with and upstanding from the outer wall, the fingers constituting means for directing the packing into the groove, and the ends of the fingers constituting means whereby the valve seat may be rotated.

2. In a device of the class described, a pump; an annular valve seat threaded into the pump and provided in its upper face with an annular groove defining spaced inner and outer walls; a resilient packing mounted in the groove and engaged laterally by the walls, the packing upstanding above the walls; there being free ended fingers upstanding from the seat, in alinement with the outer wall, the inner upright faces of the fingers slanting downwardly and inwardly; and a valve mounted to reciprocate in the pump, and to rest upon the packing; the fingers constituting means for preventing lateral spreading of the packing, and the ends of the fingers constituting means for facilitating the rotation of the valve seat, the slanting faces of the fingers constituting means for directing the valve upon the packing, and constituting also, means for directing the packing into the groove.

In testimony that I claim the foregoing as my own, I have hereto affixed my signature in the presence of two witnesses.

JOHN THOMPSON.

Witnesses:
PAUL R. J. HEATH,
B. M. PEARLMAN.